(12) United States Patent
Kristiansen (10) Patent No.: US 9,923,601 B2
(45) Date of Patent: Mar. 20, 2018

(54) SUBSEA DATA COMMUNICATION INTERFACE UNIT

(71) Applicant: Siemens Aktiengesellschaft, München (DE)

(72) Inventor: Karstein Kristiansen, Trondheim (NO)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 14/900,631

(22) PCT Filed: Jun. 18, 2014

(86) PCT No.: PCT/EP2014/062801
§ 371 (c)(1),
(2) Date: Dec. 22, 2015

(87) PCT Pub. No.: WO2015/014535
PCT Pub. Date: Feb. 5, 2015

(65) Prior Publication Data
US 2016/0149613 A1 May 26, 2016

(30) Foreign Application Priority Data

Jul. 31, 2013 (EP) .................................... 13178752

(51) Int. Cl.
*H04B 3/50* (2006.01)
*H04L 25/02* (2006.01)
*H04B 3/46* (2015.01)

(52) U.S. Cl.
CPC ................ *H04B 3/50* (2013.01); *H04B 3/46* (2013.01); *H04L 25/028* (2013.01); *H04L 25/0266* (2013.01)

(58) Field of Classification Search
CPC ........... H04B 3/50; H04B 3/46; H04L 25/028; H04L 25/0266
See application file for complete search history.

(56) References Cited

U.S. PATENT DOCUMENTS 6,408,032 B1 * 6/2002 Lye ....................... H04L 25/085
327/307
6,870,928 B1 * 3/2005 Conroy ............... H04L 25/0266
379/391

(Continued)

FOREIGN PATENT DOCUMENTS

GB 2449428 A 11/2008

OTHER PUBLICATIONS

Chaffey et al; "Mbari's buoy based seafloor observatory design"; Oceans 04, MTTS/IEEE Techno-Ocean 04; vol. 4; pp. 1975-1984; ISBN: 978-0-7803-8669-3; DOI:10.1109/Oceans.2004.1406447; XP010776673; 2004, Nov. 2004.

(Continued)

*Primary Examiner* — Kenneth Lam
(74) *Attorney, Agent, or Firm* — Harness, Dickey & Pierce, P.L.C.

(57) ABSTRACT

A subsea data communication interface unit for enabling data communication over a subsea data transmission line is disclosed. The subsea data communication interface unit includes at least an electrical interface for providing an electrical connection to the subsea data transmission line and a transmitter adapted to generate a data signal corresponding to the data to be transmitted. To obtain stable, robust and reliable communication, it is proposed that the subsea data communication interface unit includes a first voltage amplifier connected between the transmitter and the electrical interface. The first voltage amplifier is configured to convert (Continued)

the data signal generated by the transmitter from a lower voltage signal to a higher voltage signal.

11 Claims, 3 Drawing Sheets

(56) References Cited

U.S. PATENT DOCUMENTS

| | | | | |
|---|---|---|---|---|
| 7,261,162 B2* | 8/2007 | Deans | ................ | E21B 41/0007 |
| | | | | 166/250.01 |
| 8,532,165 B2* | 9/2013 | Carter | ................. | H03G 3/3078 |
| | | | | 370/203 |
| 9,049,014 B2* | 6/2015 | Kristiansen | ......... | E21B 33/0355 |
| 2002/0037054 A1 | 3/2002 | Schurig | | |
| 2005/0089158 A1* | 4/2005 | Kuo | ........................ | H04L 12/66 |
| | | | | 379/413.02 |
| 2005/0243983 A1* | 11/2005 | Causier | ................ | H04M 11/066 |
| | | | | 379/93.01 |
| 2008/0080105 A1* | 4/2008 | Blaha | .................... | H04L 12/10 |
| | | | | 361/38 |
| 2008/0315682 A1* | 12/2008 | Hussain | .................. | H04L 12/10 |
| | | | | 307/2 |
| 2008/0316004 A1* | 12/2008 | Kiko | ........................ | H04B 3/56 |
| | | | | 340/12.34 |
| 2010/0284453 A1* | 11/2010 | Brekke | .................. | H04B 3/542 |
| | | | | 375/222 |
| 2011/0050004 A1* | 3/2011 | Johansen | ................ | H01F 27/38 |
| | | | | 307/412 |
| 2011/0075741 A1* | 3/2011 | Li | ..................... | H04L 12/40032 |
| | | | | 375/258 |
| 2011/0267177 A1* | 11/2011 | Kim, II | .................... | H04B 3/56 |
| | | | | 340/12.32 |
| 2012/0217802 A1* | 8/2012 | Kanakasabai | ............. | H02J 3/36 |
| | | | | 307/32 |
| 2012/0267955 A1* | 10/2012 | Zhan | ......................... | H02J 1/06 |
| | | | | 307/31 |
| 2013/0148747 A1* | 6/2013 | Puchiano | .............. | H04L 25/026 |
| | | | | 375/257 |
| 2013/0200617 A1* | 8/2013 | Smith | ....................... | H02P 9/02 |
| | | | | 290/43 |
| 2013/0286550 A1* | 10/2013 | Hazel | ...................... | H02B 7/00 |
| | | | | 361/673 |
| 2014/0035504 A1* | 2/2014 | Rongve | ............. | G05B 23/0235 |
| | | | | 318/434 |
| 2014/0253129 A1* | 9/2014 | Heelan | .................. | G01V 3/083 |
| | | | | 324/332 |

OTHER PUBLICATIONS

German Office Action dated Oct. 2, 2013.
International Search Report PCT/ISA/210 for International Application No. PCT/EP2014/062801 dated Jul. 10, 2014.
International Preliminary Report on Patentability for International Application No. PCT/EP2014/062801 dated Jul. 1, 2015.

* cited by examiner

SUBSEA DATA COMMUNICATION INTERFACE UNIT

PRIORITY STATEMENT

This application is the national phase under 35 U.S.C. § 371 of PCT International Application No. PCT/EP2014/062801 which has an International filing date of Jun. 18, 2014, which designated the United States of America and which claims priority to European patent application number EP13178752.5 filed Jul. 31, 2013, the entire contents of which are hereby incorporated herein by reference.

FIELD

An embodiment of the present invention generally relates to a subsea data communication interface unit for enabling data communication over a subsea data transmission line and/or a method for operating the aforementioned subsea data communication interface unit.

BACKGROUND

Currently, such subsea industrial appliances use for communication existing copper infrastructures and connectors, which are restricted to a low bandwidth. Standard Ethernet communication that employs a voltage level defined in the Ethernet standard 802.3, which is based on a voltage of ±2.5 Volts (V), like in standard office environments, cannot be used due to problems with instability and noise. Therefore, losses in signal intensity may occur.

SUMMARY

The inventors have recognized that, in the near future, an increasing demand of bandwidth in communication systems will be needed. They have recognized that this need will be particularly urgent for subsea industrial appliances with devices that are positioned with long distances from each other.

An embodiment of the present invention includes a subsea data communication interface unit for enabling data communication over a subsea data transmission line, which provides a reliable and robust communication, especially in an environment with extreme conditions, like high pressure, fluctuating current or difficult accessibility.

An embodiment of the present invention includes a method for operating the aforementioned subsea data communication interface unit to establish reliable and stabilised communication between units being located subsea.

An embodiment of the present invention is directed to a subsea data communication interface unit and an embodiment of the present invention is directed to a method.

According to a first embodiment of the present invention, a subsea data communication interface unit for enabling data communication over a subsea data transmission line comprises at least: an electrical interface for providing an electrical connection to the subsea data transmission line and a transmitter adapted to generate a data signal corresponding to the data to be transmitted.

An embodiment of the invention further relates to a subsea industrial appliance with at least one inventive subsea data communication interface unit. Hence, infrastructures with units or devices, which are located great distances from one another and specifically distances more than 100 meters can communicate quickly and thus be operated easily.

According to a further aspect of an embodiment of the present invention, a method for operating a subsea data communication interface unit is presented.

It is proposed, that an embodiment of the method comprises at least the following steps: Connecting at least a transmitter and a transceiver by a subsea data transmission line; transforming a low voltage signal by a voltage amplifier into a high voltage signal, wherein the high voltage signal travels the subsea data transmission line.

The above-described characteristics, features and advantages of this invention and the manner in which they are achieved are clear and clearly understood in connection with the following description of example embodiments which are explained in connection with the drawings.

BRIEF DESCRIPTION OF THE DRAWINGS

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION OF EXAMPLE EMBODIMENTS

The illustrations in the drawings are schematically. It is noted that in different figures, similar or identical elements are provided with the same reference signs.

According to a first embodiment of the present invention, a subsea data communication interface unit for enabling data communication over a subsea data transmission line comprises at least: an electrical interface for providing an electrical connection to the subsea data transmission line and a transmitter adapted to generate a data signal corresponding to the data to be transmitted.

It is proposed, that the subsea data communication interface unit further comprises a first voltage amplifier connected between the transmitter and the electrical interface, wherein the first voltage amplifier is configured to convert the data signal generated by the transmitter from a lower voltage signal to a higher voltage signal.

Due to an embodiment of the inventive matter, a novel proprietary physical Ethernet layer may be provided that permits increased electrical noise margins and communication distances compared to a standard Ethernet layer. Thus, a reliable and robust communication can be obtained, especially in an environment not intended for regular Ethernet physical layer signalling. Moreover, existing subsea infrastructures, like copper cables and subsea equipment or connectors, may be applied. Hence, development efforts and costs to gain new parts or structures for subsea use may be advantageously saved. Furthermore, well proven and already certified technology can be used.

Even if the terms "subsea data transmission line, electrical interface, transmitter, transceiver, data signal and voltage amplifier" are used in the singular form in the claims and the specification the scope of the patent (application) should not be restricted to the singular form. It should also lie in the scope of the invention to have more than one or a plurality of the above mentioned structure(s).

The term "subsea data transmission line" should be understood as a cord or wire that primarily transfers or transmits data, especially digital data. An additional subordinate transfer of another medium, like power, should not hinder the use of the term "subsea data transmission line". The use of the wording "transmission line" in the following text should be understood as "subsea data transmission line". The transmission line preferably spans a distance having a value that is more than 100 meters (m), especially a value between 500 m and 800 m, preferably a value that is more than 1 kilometer (km) and may be even more than 5 km.

The transmitter is intended to transmit data, especially digital data. It may be a part of a device or unit of a subsea industrial appliance, like a network of different units or devices, like a subsea electrical unit (e.g. a subsea control unit, a subsea communication unit, a subsea sensor unit) connected by data transmission lines. This unit may be a control unit or a controlled unit, wherein in this context a control unit is intended to mean a processing unit or at least a part of a computer or an infrastructure of computers.

Further, a controlled unit is intended to mean an industrial device, machine or apparat with a control and/or monitor interface, preferably based on Ethernet, like a pump, a converter, a compressor, a switchgear or a high voltage transformer working e.g. with a voltage of 72 Kilovolts (kV) etc. Switchgears are an example for having both a controlling and a monitoring interface. A high voltage transformer may have only a monitoring interface and no controlling interface, but could be equipped with monitoring equipment with an Ethernet interface. The unit comprising the transmitter may additionally have a transceiver that is intended to receive data transmitted by an additional transmitter.

Furthermore, the unit with the transmitter and/or transceiver may be arranged in a subsea enclosure, which is enabled to operate subsea or in a depth of more than 1000 m, respectively. Thus, the subsea data communication interface unit is located on a sea bed, wherein the phrase "located on a sea bed" is intended to mean a positioning directly on the subsea or in near vertical proximity, like max. 10 m, to the sea bed, either above or beneath. Hence, the subsea data communication interface unit is adapted (equipped, primed) to be installed, arranged and/or operated subsea for providing data communication for a subsea location.

In this context an electrical interface is intended to mean a structure that provides electrical contact between two pieces, like a unit of the subsea data communication interface unit and the subsea data transmission line. Not only a direct contact between the parts should lie in the scope of this meaning but also the arrangement of additional parts between the parts. The electrical interface may be any structure feasible for a person skilled in the art e.g. an electrical and/or optical connector and/or penetrator, a wet mateable connector etc.

An amplifier may be any device feasible for a person skilled in the art and it may be either passive or active. In other words, it may be working with a passive or active mechanism.

It is further provided, that the first voltage amplifier is designed to generate from a regular Ethernet signal voltage an output signal voltage of the subsea data transmission line that is at least ±10 V and preferably higher than ±25 V. In other words, the voltage established in the subsea data transmission line is at least ±10 V and preferably higher than ±25 V. A regular Ethernet signal voltage is a voltage of maximal ±2.5 V. Thus, the subsea data transmission line has an Ethernet layer based on non-standard voltage. The use of a non-standard current may be also possible. Consequently, a broader bandwidth in reference to the state of the art systems may be obtained. Moreover, a low voltage device may be connected easily via the transmission line with a high voltage device. Hence, the transmission line transmits a signal voltage with a value higher than ±2.5 V or in other words the signal voltage traveling the transmission line is higher than ±2.5 V.

According to a preferred realisation, the subsea data communication interface unit comprises a subsea data transmission line, wherein the electrical interface provides an electrical connection of the transmitter to the subsea data transmission line and wherein the subsea data transmission line comprises a subsea copper cable and/or even is a subsea copper cable. Hence, the copper cable conducts the Ethernet signal. Consequently, existing subsea infrastructures may be easily retrofitted for use of Ethernet communication, especially over long distances.

In a preferred embodiment, a second voltage amplifier is provided that is connected between a transceiver and a second electrical interface providing an electrical connection to the subsea data transmission line. Thus, the amplification may be easily changed or even reversed. The second voltage amplifier is configured to convert the data signal generated by the transmitter from a higher voltage signal to a lower voltage signal. Hence, the output signal voltage in the subsea data transmission line may be transformed back to a low voltage signal and thus allowing the connection of a device, which is sensitive to a voltage higher than ±2.5 V. In general, it may be possible to use more than two voltage amplifiers. The transceiver is intended to receive data, especially digital data, from a transmitter. It may be a part of a device or unit of a subsea industrial appliance, like a network of different units or devices, like a subsea electrical unit (e.g. a subsea control unit, a subsea communication unit, a subsea sensor unit) connected by data transmission lines. As stated above one unit may either comprise a transmitter or a transceiver or both.

Preferably, the first voltage amplifier and the second voltage amplifier are embodied equally. Via this, the equally embodied devices may be connected without risk of voltage overload with each other. Furthermore, no special attention has to be applied by assembling the subsea data transmission line, the transmitter and the transceiver.

It is further provided, that the first voltage amplifier is a passive electrical component, whereby an additional power supply may be omitted, thus saving space, parts, assembling effort as well as costs. In addition, the second voltage amplifier may also be a passive electrical component or may works with a passive electrical mechanism, respectively.

Advantageously, the passive electrical component is a transformer with a M:N winding ratio, with M<N. Consequently, the voltage may be amplified constructively easy and effectively. Moreover, a galvanic isolation may be provided. A secure transformation of voltage for the transmitter and the transceiver can be provided, when M is the number of windings on the low voltage side of the voltage amplifier and/or N is the number of windings on the high voltage side of the voltage amplifier.

As stated above, a second voltage amplifier may be provided. In this case, N may be the number of windings on the high voltage side of both, the first and the second, voltage amplifiers, providing sufficient amplification. Preferably, N and M are the same for both voltage amplifiers. In other words, the transformers of the first and the second voltage amplifier have the same ratio between the primary and secondary windings. This ensures the transformation is performed equally by both amplifiers and thus equally for the low voltage device connected via the transformer to the subsea data transmission line.

Moreover, by choosing N in such a way that N is a number between 2 and 20 a high amplification rate and thus a high voltage signal or level, respectively, in the subsea data transmission line may be established. This increases a difference between the signal and the noise resulting in a better signal to noise ratio compared to state of the art systems. An efficient and robust signal and hence communication between the transmitter and the transceiver may be gained.

According to an alternative example embodiment, the first voltage amplifier comprises an active electrical component. Due to this, an amplification of the voltage may be adjusted or changed in dependence of special needs of the application. As a result, a dynamic system can be provided. The advantages of an active electrical component or mechanism, respectively, may be constructively easy accomplished, when the active electrical component is a line driver. Such a line driver would be equipped with adequate specifications regarding its application of use and for example according to the needed bandwidth. A person skilled in the art would select these specifications according to his knowledge in the art.

Furthermore, in the case of a use of the first voltage amplifier and a second voltage amplifier, it has been shown that the application is flexible, robust and reliable, when the first voltage amplifier and the second voltage amplifier are embodied differently. Thus, one voltage amplifier may be a passive and the other may comprise an active electrical component.

In a further realization of an embodiment of the invention, the active electrical component or the line driver, respectively, is arranged at a low voltage side of the voltage amplifier, wherein a passive electrical component or a transformer with a N:N winding ratio, e.g. a regular Ethernet transformer, is provided that is arranged at a high voltage side of the first voltage amplifier. Thus, the amplification can be performed solely and controlled by the active electrical component. Moreover, a galvanic isolation between the line driver and the high voltage part of the transmission line may be obtained.

An embodiment of the inventive novel and proprietary Ethernet connection comprises two subsea data transmission lines. Each line has two twisted pairs of wires. One set of twisted wires are used for transmission (TX) and the other set of twisted wires for receiving (RX) a signal. The wires originating at one side of the connection as transmitting wires end up as RX wires on the other side and vice versa. Thus, the aforementioned novel Ethernet connection has at least four voltage amplifiers; two at each device or the transmitter and the transceiver, respectively. From these two amplifiers of the transmitter and the transceiver, respectively, one is used for transmitting and the other for receiving a signal.

According to a further aspect of an embodiment of the present invention, the first voltage amplifier is located at a transmitting end of the subsea data transmission line and comprises an active electrical component and the second voltage amplifier is located at a receiving end of the subsea data transmission line and is a passive electrical component. As explained above, the second subsea data transmission line has a vice versa arrangement. By providing an extra power supply at the transmitting end of the communication link a flexible but robust transmission and thus communication can be established.

In an advantageously embodiment of the invention the first voltage amplifier is located at a transmitting end of the subsea data transmission line and comprises a line driver and wherein the second voltage amplifier is located at a receiving end of the subsea data transmission line and is a transformer with a M:N winding ratio, with M<N. As a result well proven, reliable and easy to obtain parts can be used.

An embodiment of the invention further relates to a subsea industrial appliance with at least one inventive subsea data communication interface unit. Hence, infrastructures with units or devices, which are located great distances from one another and specifically distances more than 100 meters can communicate quickly and thus be operated easily.

According to a further aspect of an embodiment of the present invention, a method for operating a subsea data communication interface unit is presented.

It is proposed, that an embodiment of the method comprises at least the following steps: Connecting at least a transmitter and a transceiver by a subsea data transmission line; transforming a low voltage signal by a voltage amplifier into a high voltage signal, wherein the high voltage signal travels the subsea data transmission line.

In this embodiment, an Ethernet communication may be provided that permits increased electrical noise margins and communication distances compared to standard Ethernet communication. Thus, a reliable and robust communication can be obtained, especially in an environment not intended for regular Ethernet physical layer signalling.

The method further comprises the step of transforming the high voltage signal by a second voltage amplifier into a low voltage signal.

Figure 1:
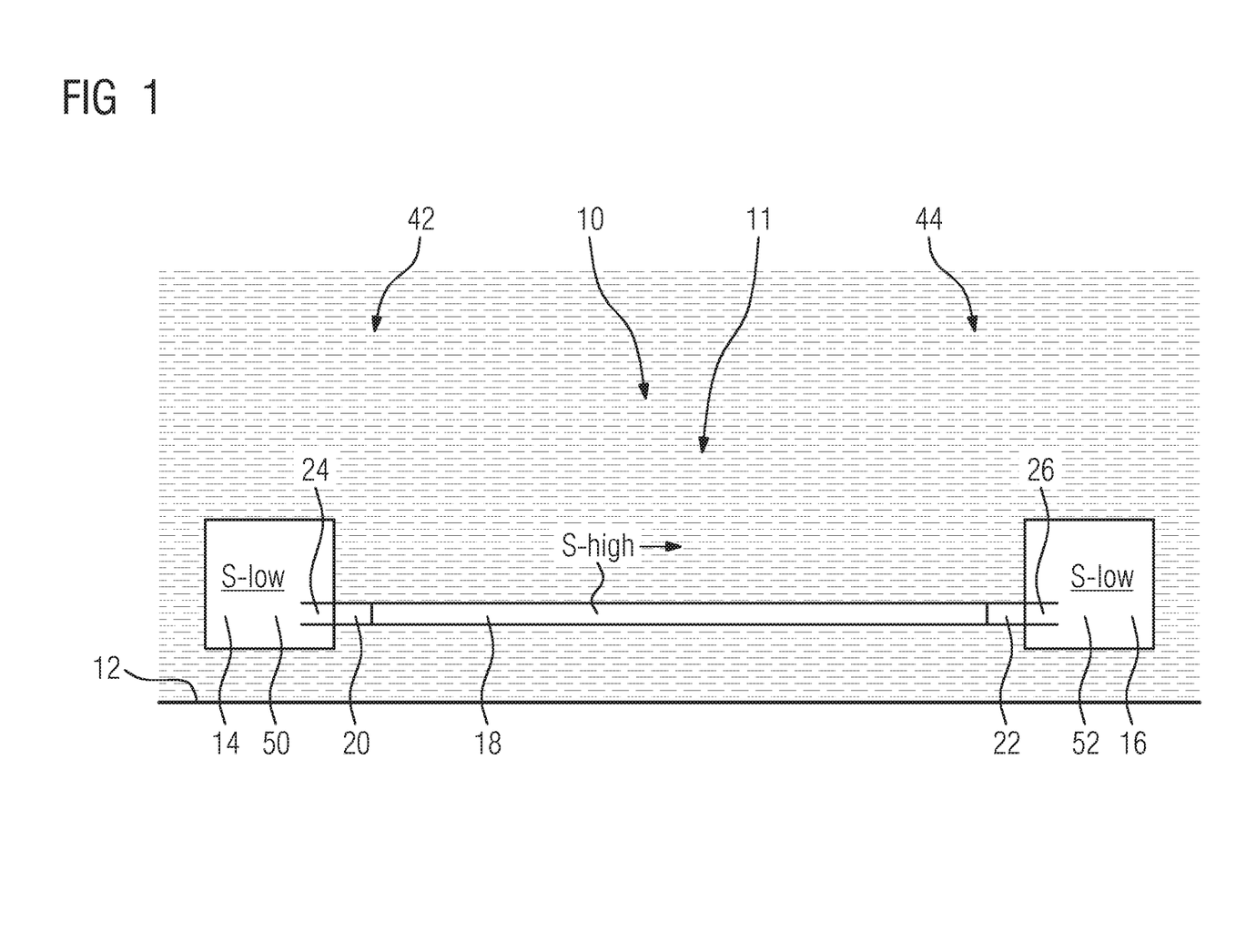
FIG. 1: shows schematically an subsea industrial appliance located on a subsea with an inventive subsea data communication interface unit.

FIG. 1 shows schematically a subsea industrial appliance 10 located on a sea bed 12. The subsea industrial appliance 10 has a subsea data communication interface unit for enabling data communication over a subsea data transmission line 18 (named in the following text as transmission line 18). The subsea data communication interface unit 11 comprises a transmitter 14 adapted to generate a data signal corresponding to the data to be transmitted by the data transmission line 18. The transmitter 14 may be a part of a computer for example. This computer may be a control unit 50 or a part thereof to control an operation of other devices of the subsea industrial appliance or the subsea data communication interface unit 11, respectively. Moreover, the subsea data communication interface unit 11 comprises a transceiver 16, which is a part of an industrial device of the subsea industrial appliance 10. The industrial device may be a pump for example and may be a controlled unit 52 being controlled by the control unit 50. The transmitter 14 or the control unit 50, respectively, may be encase in a box (not shown in detail), which is filled with oil or inert gas, like N2, to ensure secure operation. The subsea data communication interface unit 11 further comprises two subsea data transmission lines 18 that connect the control unit 50 and the controlled unit 52 and are embodied as copper based infrastructures (for details see FIG. 2). Moreover, the subsea data communication interface unit 11 comprises per subsea data transmission line 18 two electrical interfaces 20, 22 for providing an electrical connection of the transmitter 14 or the transceiver 16, respectively, to the subsea data transmission line 18 (the electrical interfaces 20, 22 are shown for better presentability in enlarged dimensions in FIG. 1). An environment on or near the sea bed 12 differs, for example due to pressure, electrical noise, temperature etc., to a known environment in an office. Thus, regular setups with known connectors or transmission lines used for standard Ethernet communication in offices are not suitable to provide a reliable, robust and stable communication subsea, especially not over a distance longer than 100 meters (m).

The subsea data communication interface unit 11 further comprises a first voltage amplifier 24 that is connected between the transmitter 14 and the electrical interface 20. Moreover, a second voltage amplifier 26 is provided that is connected between the transceiver 16 and the electrical interface 22. The transmission line 18 is longer than 100 m and especially between 500 m and 800 m, but may be longer than 1 kilometer (km) or even longer than 5 km to connect units, which are located a long distance from each other on the sea bed 12.

Figure 2:
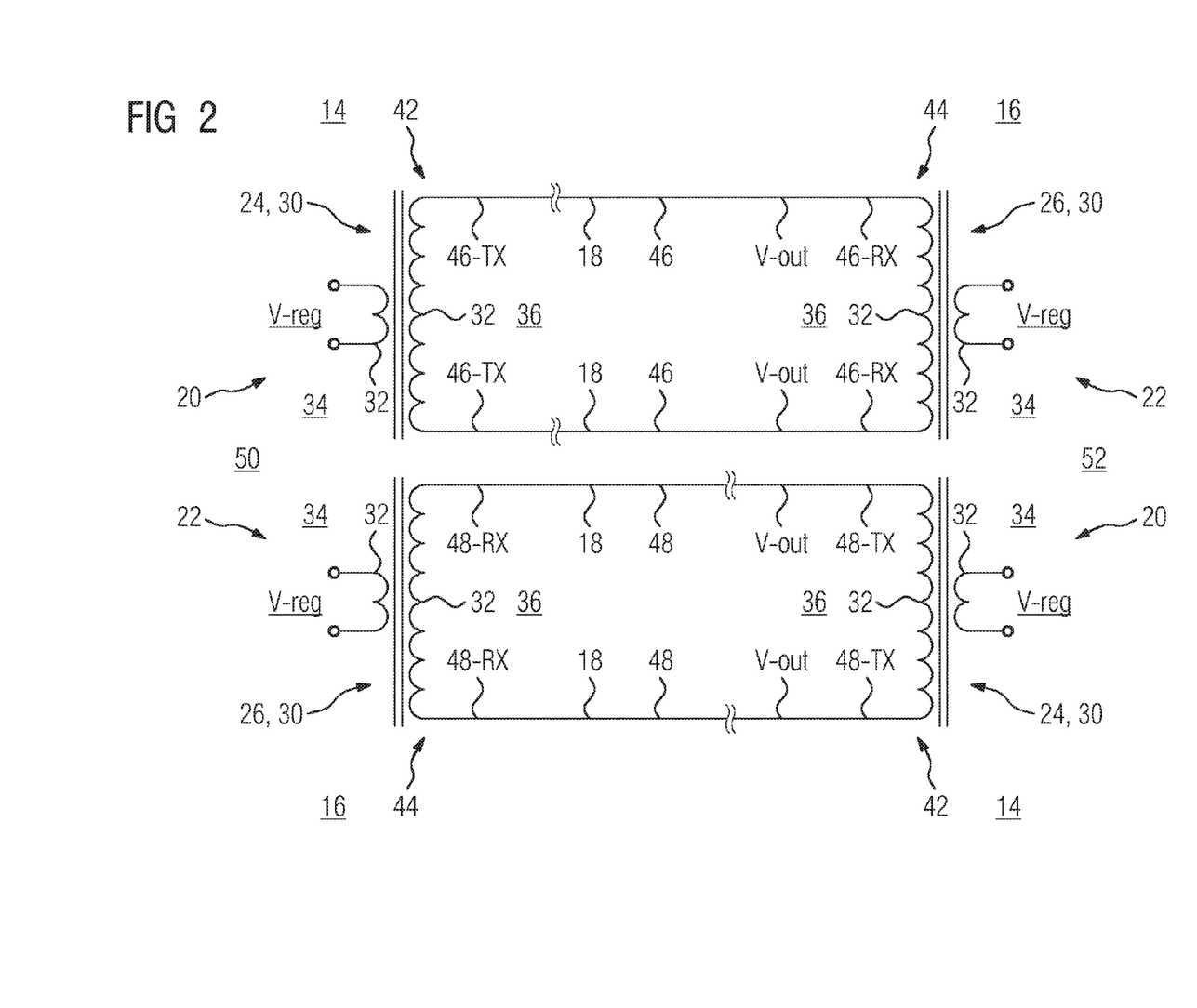
FIG. 2: shows in a wiring diagram two subsea data transmission lines connecting a transmitter and a transceiver of the subsea data communication interface unit from FIG. 1 with four amplifier working with a passive mechanism.

FIG. 2 shows a wiring diagram of the two subsea data transmission lines 18 and their four voltage amplifiers 24, 26. Each transmission line 18 has two twisted pairs of wires 46, 48 (not shown in detail). One set of twisted wires 46 are used for transmission (TX) of a signal from the control unit 50 (upper part of FIG. 2) and the other set of twisted wires 48 for receiving (RX) the signal by the controlled unit 52 (lower part of FIG. 2). Communication in direction from the controlled unit 52 to the control unit 50 is designed vice versa. The wires 46, 48 originate at one side of the connection as transmitting wires 46-TX, 48-TX and end up as receiving wires 46-RX, 48-RX on the other side. Hence, one transmitter 14 and each first voltage amplifier 24 are located at a transmitting end 42 of a subsea data transmission line 18 and one transceiver 16 and each second voltage amplifier 26 are located at a receiving end 44 of a subsea data transmission line 18. Further, both units 50, 52 each comprise a transmitter 14 and a transceiver 16.

Each first voltage amplifier 24 is configured to convert the data signal generated by a transmitter 14 from a lower voltage signal S-low to a higher voltage signal S-high. Specifically, each first voltage amplifier 24 is designed to generate from a regular Ethernet signal voltage V-reg an output signal voltage V-out in the transmission line 18 that is at least ±10 Volts (V) and preferably higher than ±25 V. Each second voltage amplifier 26 in turn is configured to convert the data signal generated by the transmitter 14 from the higher voltage signal S-high to a lower voltage signal S-low. Hence, each second voltage amplifier 26 is designed to decrease the output signal voltage V-out back to the regular Ethernet signal voltage V-reg. The regular Ethernet signal voltage V-reg is ±2.5 V and is e.g. the voltage used to operate the control unit 50 or the controlled unit 52, respectively. Hence, the output signal voltage V-out in the transmission line 18 is at least 4 times higher than the standard Ethernet signal voltage V-reg. Consequently, increased electrical noise margins and communication distances are permitted compared to standard Ethernet communication.

As a result, the subsea Ethernet connection has four voltage amplifiers 24, 26; two at the control unit 50 (for TX or RX) and two at the controlled unit 52 (for TX or RX), respectively. From these two voltage amplifiers 24, 26 at each unit 50, 52 one is used for transmitting and the other for receiving a signal. The first voltage amplifier 24 and the second voltage amplifier 26 or all four amplifiers 24, 26, respectively, are embodied equally in this example embodiment. Each voltage amplifier 24, 26 is a passive electrical component and specifically a transformer 30 with a M:N winding ratio, with M<N. M is the number of windings 32 on a low voltage side 34 of each voltage amplifier 24, 26 and N is the number of windings 32 on a high voltage side 36 of each voltage amplifier 24, 26. In this example embodiment M is 1 and N is 4.

After connecting the control unit 50 and the controlled unit 52 by the subsea data transmission line 18 with each other and thus for each subsea data transmission line 18 a transmitter 14 and a transceiver 16 the subsea industrial appliance 10 or the subsea data communication interface unit 11, respectively, is further operated, as it is depicted in FIG. 1 exemplarily for the operating direction from the control unit 50 to the controlled unit 52, by transforming a low voltage signal S-low by the voltage amplifier 24 located at the transmitting end 42 of the subsea data transmission line 18 at the transmitter 14 (control unit 50) into a high voltage signal S-high, wherein the high voltage signal S-high travels the subsea data transmission line 18 to the receiving end 44 of the transmitting line 18 or to the transceiver 16 (controlled unit 52). There the high voltage signal S-high is transformed back according to the specification of the voltage amplifier 26 to the low voltage signal S-low. A communication in the opposite direction is performed analogously.

Figure 3:
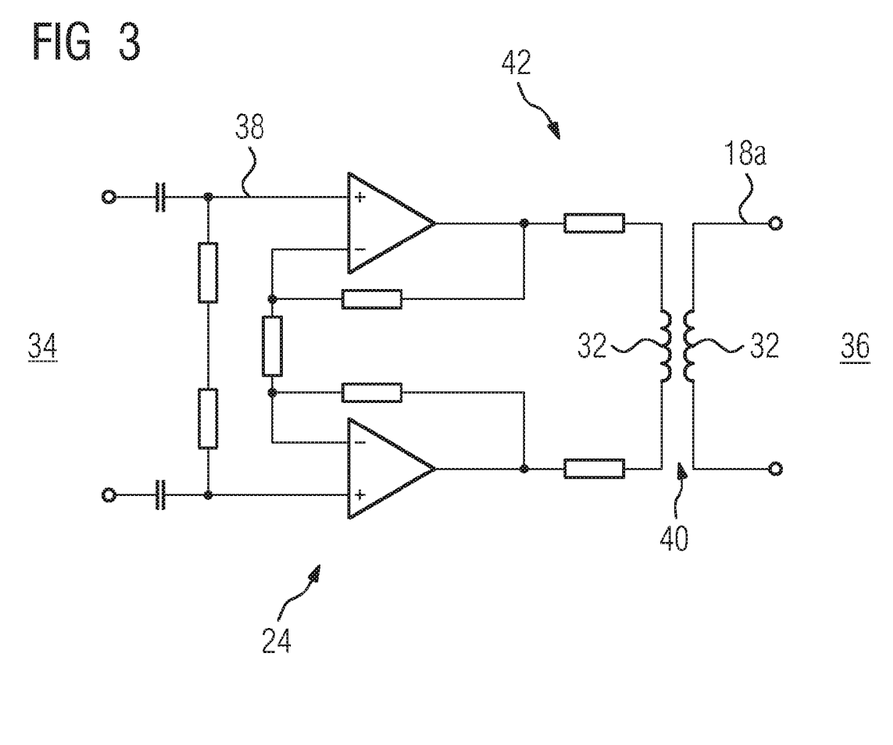
FIG. 3: shows a schematic view of a transmitting end of an alternative subsea data transmission line with an alternative amplifier working with an active mechanism and, FIG. 4: shows schematically an amplifier at a receiving end of the subsea data transmission line from FIG. 3.
Figure 4:
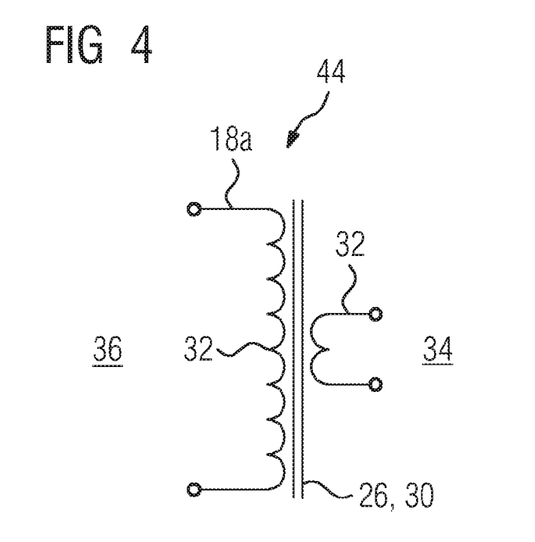

FIGS. 3 and 4 show an alternative example embodiment of the subsea data transmission line 18. Identical components, features and functions are denoted by the same reference numerals. However, to distinguish the example embodiment of FIGS. 3 and 4 over that of FIGS. 1 and 2 the letter 'a' has been added to the reference numerals of the components that are designed differently in the example embodiment of FIGS. 3 and 4. The description below is substantially limited to these differences compared to the example embodiment of FIGS. 1 and 2, wherein reference is made to the description of the example embodiment in FIGS. 1 and 2 with respect to identical components, features, and functions.

A subsea data transmission line 18a shown in FIGS. 3 and 4 differs from the subsea data transmission line 18 described in FIGS. 1 and 2 in that a first voltage amplifier 24 and a second voltage amplifier 26 are embodied differently from each other. The first voltage amplifier 24 comprises an active electrical component, specifically, a line driver 38 and the second voltage amplifier 26 is a transformer 30 embodied analogously to the transformer 30 in FIGS. 1 and 2.

As could be seen in FIG. 3, which depicts a wiring diagram of the first voltage amplifier 24, the line driver 38 is arranged at a low voltage side 34 of the first voltage amplifier 24. At a high voltage side 36 of the first voltage amplifier 24 a transformer 40 is provided, wherein the transformer 40 is a regular Ethernet transformer 40 with a N:N winding ratio of its windings 32, wherein N is in this example embodiment 4. Furthermore, the first voltage amplifier 24 is located at a transmitting end 42 of the subsea data transmission line 18a (not shown in detail) and performs the transmitting of a signal.

In FIG. 4 a receiving end 44 of the subsea data transmission line 18a is shown. At the receiving end 44 the second voltage amplifier 26 or transformer 30 with a M:N (1:4) winding ratio of its windings 32, respectively, is located.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

Although the invention is illustrated and described in detail by the preferred embodiments, the invention is not limited by the examples disclosed, and other variations can be derived therefrom by a person skilled in the art without departing from the scope of the invention.

The invention claimed is:

1. Subsea data communication interface unit for enabling data communication over a subsea data transmission line, comprising:
   a first electrical interface provided at a first end of the subsea data transmission line to provide an electrical connection to the subsea data transmission line;
   a first transmitter provided at the first end of the subsea data transmission line and adapted to generate a data signal corresponding to data to be transmitted;
   a voltage amplifier provided at the first end of the subsea data transmission line, connected between the first transmitter and the first electrical interface, the voltage amplifier being configured to convert the data signal generated by the transmitter from a lower voltage signal to a higher voltage signal, wherein the voltage amplifier is a transformer with a M:N winding ratio, with M<N, wherein M is a number of windings on a low voltage side of the voltage amplifier and N is a number of windings on a high voltage side of the voltage amplifier;
   a second electrical interface provided at a second end of the subsea data transmission line to provide an electrical connection to the subsea data transmission line;
   a second transmitter provided at the second end of the subsea data transmission line and adapted to generate a data signal corresponding to data to be transmitted; and
   a voltage converter provided at the second end of the subsea data transmission line, connected between a transceiver and the second electrical interface, providing an electrical connection to the subsea data transmission line, wherein the voltage amplifier is configured to generate from a regular Ethernet signal voltage an output signal voltage of the subsea data transmission line that is at least ±10 Volts.

2. Subsea data communication interface unit of claim 1, wherein the voltage converter is configured to convert the data signal generated by the second transmitter from the higher voltage signal to the lower voltage signal and is a transformer with a M:N winding ratio, with M<N, wherein M is the number of windings on a low voltage side of the voltage converter and N is the number of windings on a high voltage side of the voltage converter.

3. Subsea data communication interface unit of claim 1, further comprising:
   a subsea data transmission line, wherein the first electrical interface and the second electrical interface provides an electrical connection of the first transmitter and the second transmitter to the subsea data transmission line and wherein the subsea data transmission line comprises a subsea copper cable.

4. Subsea data communication interface unit of claim 1, wherein N is a number between 2 and 20.

5. Subsea data communication interface unit of claim 1, wherein the voltage amplifier is designed to generate from a regular Ethernet signal voltage an output signal voltage of the subsea data transmission line that is higher than ±25 V.

6. Subsea data communication interface unit for enabling data communication over a subsea data transmission line, comprising:
   a first electrical interface at a first end of the subsea data transmission line for providing an electrical connection to the subsea data transmission line;
   a transmitter adapted to generate a data signal corresponding to data to be transmitted;
   a voltage amplifier connected between the transmitter and the first electrical interface, wherein the voltage amplifier is configured to convert the data signal generated by the transmitter from a relatively lower voltage signal to a relatively higher voltage signal;
   a voltage converter at a second end of the subsea data transmission line, connected between a transceiver and a second electrical interface providing an electrical connection to the subsea data transmission line, configured to convert a transmitted data signal from the higher voltage signal to the lower voltage signal,
   wherein the voltage amplifier is located at a transmitting end of the subsea data transmission line and comprises a line driver,
   wherein the voltage converter is located at a receiving end of the subsea data transmission line, the voltage converter being a transformer with a M:N winding ratio, with M<N, wherein M is a number of windings on a low voltage side of the voltage converter and N is a number of windings on a high voltage side of the voltage converter, wherein the voltage amplifier is configured to generate from a regular Ethernet signal voltage an output signal voltage of the subsea data transmission line that is at least ±10 Volts.

7. Subsea data communication interface unit of claim 6, wherein the voltage amplifier comprises an active electrical component.

8. Subsea data communication interface unit of claim 7, wherein the active electrical component is a line driver.

9. Subsea data communication interface unit of claim 8, wherein the line driver is arranged at the low voltage side of the voltage amplifier, wherein a transformer with a N:N winding ratio is provided that is arranged at the high voltage side of the voltage amplifier.

10. Method for operating a subsea data communication interface unit including a first control unit having a first electrical interface to provide an electrical connection to the subsea data transmission line; a first transmitter in the first control unit and adapted to generate a data signal corresponding to the data to be transmitted; a voltage amplifier in the first control unit, connected between the first transmitter and the first electrical interface, the voltage amplifier being configured to convert the data signal generated by the first transmitter from a lower voltage signal to a higher voltage signal, wherein the voltage amplifier is a transformer with a M:N winding ratio, with M<N, wherein M is a number of windings on a low voltage side of the voltage amplifier and N is a number of windings on a high voltage side of the voltage amplifier; a second control unit having a second electrical interface provided at a second end of the subsea data transmission line to provide an electrical connection to the subsea data transmission line; a second transmitter in the second control unit provided at the second end of the subsea data transmission line and adapted to generate a data signal corresponding to the data to be transmitted; and a voltage converter, in the second control unit, provided at the second end of the subsea data transmission line, connected between a transceiver and the second electrical interface, providing an electrical connection to the subsea data transmission line, the method comprising:

transforming, in the first control unit, a low voltage signal by the voltage amplifier into a high voltage signal, wherein the high voltage signal is configured to travel a subsea data transmission line connecting at least a transmitter and a transceiver,     generating from a regular Ethernet signal voltage an output signal voltage of the subsea data transmission line that is at least ±10 Volts,     receiving, in the second control unit, the high voltage signal at the voltage converter, and     transforming, in the second control unit, the high voltage signal to the low voltage signal.

11. Method for operating a subsea data communication interface unit including a first electrical interface at a first end of the subsea data transmission line for providing an electrical connection to the subsea data transmission line; a transmitter adapted to generate a data signal corresponding to the data to be transmitted; a voltage amplifier connected between the transmitter and the first electrical interface, wherein the voltage amplifier is configured to convert the data signal generated by the transmitter from a relatively lower voltage signal to a relatively higher voltage signal; a voltage converter at a second end of the subsea data transmission line, connected between a transceiver and a second electrical interface providing an electrical connection to the subsea data transmission line, configured to convert a transmitted data signal from the higher voltage signal to the lower voltage signal, wherein the voltage amplifier is located at a transmitting end of the subsea data transmission line and comprises a line driver, wherein the voltage converter is located at a receiving end of the subsea data transmission line, the voltage converter being a transformer with a M:N winding ratio, with M<N, wherein M is a number of windings on a low voltage side of the voltage converter and N is a number of windings on a high voltage side of the voltage converter, the method comprising:

transforming a low voltage signal by the voltage amplifier into a high voltage signal, wherein the high voltage signal is configured to travel from the first electrical interface of the subsea data transmission line connecting at least a transmitter and a transceiver,     generating from a regular Ethernet signal voltage an output signal voltage of the subsea data transmission line that is at least ±10 Volts,     receiving the high voltage signal at the voltage converter via a second electrical interface, and     transforming the high voltage signal to the low voltage signal.

\* \* \* \* \*